US011983029B2

(12) United States Patent
Lee

(10) Patent No.: US 11,983,029 B2
(45) Date of Patent: May 14, 2024

(54) COOKTOP AND KNOB ASSEMBLY THEREOF

(71) Applicant: LG Electronics Inc., Seoul (KR)

(72) Inventor: Dae Yong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 319 days.

(21) Appl. No.: 17/460,622

(22) Filed: Aug. 30, 2021

(65) Prior Publication Data

US 2022/0066495 A1 Mar. 3, 2022

(30) Foreign Application Priority Data

Aug. 28, 2020 (KR) ........................ 10-2020-0109647

(51) Int. Cl.
*G05G 1/10* (2006.01)
*F24C 3/12* (2006.01)

(52) U.S. Cl.
CPC ............. *G05G 1/105* (2013.01); *F24C 3/124* (2013.01); *F24C 3/126* (2013.01)

(58) Field of Classification Search
CPC ......... G05G 1/105; F24C 3/124; F24C 3/126; F24C 7/082; H01H 19/025; H01H 2219/062
USPC .............. 126/1 R, 39 BA; 116/250; 362/551, 362/23.22
See application file for complete search history.

(56) References Cited

U.S. PATENT DOCUMENTS 4,807,091 A * 2/1989 Obata .................... G05G 1/105 116/286
5,694,916 A * 12/1997 Gambill .................. F24C 3/126 126/39 BA
10,345,514 B2 7/2019 Kozinski et al.
2006/0227528 A1 * 10/2006 Nakamoto ........... H01H 19/025 362/23.11
2018/0238556 A1 * 8/2018 Kozinski .............. G02B 6/0095

FOREIGN PATENT DOCUMENTS

| | | |
|---|---|---|
| EP | 3373316 | 9/2018 |
| JP | 2008288188 | 11/2008 |
| KR | 20110049269 | 5/2011 |
| KR | 20170079067 | 7/2017 |

OTHER PUBLICATIONS

Extended European Search Report in European Appln. No. 21193426.0, dated Jan. 12, 2022, 9 pages.

* cited by examiner

*Primary Examiner* — Vivek K Shirsat
(74) *Attorney, Agent, or Firm* — Fish & Richardson P.C.

(57) ABSTRACT

A cooktop includes a knob assembly coupled to a control panel and controlling a heating part. The knob assembly includes: a knob body disposed at a front surface of the control panel and rotating around a rotation shaft, a knob ring disposed at a rear side of the knob body and having a diameter greater than a diameter of the knob body, a light diffusing part disposed between the knob body and the knob ring, and a light source part comprising one or more light sources irradiating light. A diameter of the light diffusing part is greater than the diameter of the knob body and less than the diameter of the knob ring, a front surface of the light diffusing part is exposed between the knob body and the knob ring, and one of the light sources irradiates light between the knob body and the knob ring.

19 Claims, 13 Drawing Sheets

100-1

COOKTOP AND KNOB ASSEMBLY THEREOF

CROSS-REFERENCE TO RELATED APPLICATION

This application claims priority to and the benefit of Korean Patent Application No. 10-2020-0109647, filed on Aug. 28, 2020, the disclosure of which is incorporated herein by reference in its entirety.

TECHNICAL FIELD

Disclosed herein are a cooktop and a knob assembly thereof, and the cooktop and the knob assembly are capable of emitting light around a knob to enhance user recognition of operation of a product.

BACKGROUND

Cooktops heat food items using gas or electricity to cook the food items. The cooktops can include a knob that rotates around a shaft to adjust an amount of heat applied to a food item or to manipulate the cooktop such as the setting of a cooking mode and the like.

Knobs (or switches), around which light is emitted to improve visibility, is disclosed in prior art document 1 (KR Patent Publication No. 2017-0079067) and prior art document 2 (U.S. patent Ser. No. 10/345,514) and the like.

FIGS. 1 and 2 are views showing a switch assembly in prior art document 1.

The switch assembly in document 1 can include a switch 1, a light guide 2, a switch holder 3, a control panel 4, a support bracket 5, and a regulator 6.

The light guide 2 includes a light guide path 2-1 and an LED module 2-2. The LED module 2-2 is disposed at one end of the light guide path 2-1. Since the LED module 2-2 as a light source is disposed at one end of the light guide path 2-1, constant brightness of light cannot be ensured according to document 1. That is, one end of the light guide path 2-1, at which the LED module 2-2 is disposed, is relatively bright, while the other end on the opposite side of one end is relatively dark.

FIG. 3 is a view showing a portion of a knob assembly in prior art document 2.

The knob assembly in document 2 includes a first light guide 7, a second light guide 8, and a bezel main body 9. The second light guide 8 includes a leg 8-1 extended toward a light source, and a guide ring 8-2 forming a diffused light. According to document 2, the light source is disposed in an end portion of the leg 8-1. Accordingly, a portion of the guide ring 8-2, contacting the leg 8-1, is relatively bright, while a portion far from the portion in contact with the leg 8-1 is relatively dark.

SUMMARY

Technical Problem

In one embodiment, provided are a cooktop and a knob assembly thereof that may emit light having constant brightness around a knob body of the knob assembly.

In one embodiment, provided are a cooktop and a knob assembly thereof that may enhance user recognition of operation of a product and ensure improvement in aesthetic qualities.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solution

A cooktop and/or a knob assembly in one embodiment may include a light diffusing part disposed between a knob body and a knob ring. In this case, a light source part may irradiate light between the knob body and the knob ring, and front surface of the light diffusing part may be exposed to a gap between the knob body and the knob ring. Accordingly, the light irradiated from the light source part may be emitted to a front of the knob assembly through the light diffusing part, thereby making it possible to emit uniform light to the front of the knob assembly regardless of areas.

The cooktop and/or the knob assembly in one embodiment may include the light diffusing part disposed in an inner space of the knob ring, and an end of the light diffusing part may be disposed further rearward than an end of the knob ring, thereby improving visibility.

In the cooktop and/or the knob assembly of one embodiment, at least a portion of a rear surface of the knob body and at least a portion of a front surface of the knob ring may reflect light, thereby improving visibility.

A cooktop in one embodiment may include a heating part configured to cook a food item, and a manipulating part including a control panel and a knob assembly fixed to the control panel and configured to control the heating part, the knob assembly may include a knob body disposed on a front surface of the control panel and configured to rotate around a rotation shaft extended in a front-rear direction, a knob ring disposed at a rear of the knob body and having a diameter greater than a diameter of the knob body, a light diffusing part disposed between the knob body and the knob ring, and a light source part including at least one of light sources configured to irradiate light, a diameter of the light diffusing part may be greater than the diameter of the knob body and less than the diameter of the knob ring, a front surface of the light diffusing part may be exposed between the knob body and the knob ring, and at least one of the light sources may irradiate light to a space between the knob body and the knob ring.

In the cooktop of one embodiment, the knob ring may include a plate formed into a flat plate, and a ring surrounding an outer edge of the plate, protruding from the plate forward, and having a diameter greater than the diameter of the knob body.

In the cooktop of one embodiment, at least a portion of the knob body may be inserted into a space formed by the plate and the ring.

In the cooktop of one embodiment, the light diffusing part may be formed into a doughnut, and a first surface may contact the plate while a second surface different from the first surface may contact the ring.

In the cooktop of one embodiment, a front end of the light diffusing part may be disposed further rearward than a front end of the knob ring.

In the cooktop of one embodiment, the light diffusing part may include a flat plate doughnut part formed into a doughnut having a plate shape, and a cylinder part formed into a cylinder protruding forward from an outer edge of the flat plate doughnut part, and the first surface may be a rear surface of the flat plate doughnut part while the second surface may be an outer surface of the cylinder part.

In the cooktop of one embodiment, at least a portion of a rear surface of the knob body and at least a portion of a front surface of the knob ring may reflect light.

In the cooktop of one embodiment, the knob body may include a knob forming an exterior of a front surface of the knob assembly and having a rear surface that is open to form a first inner space, a knob inner inserted into the first inner space and having a rear surface that is open to form a second inner space, and an insert into which the second inner space is inserted and having a rear surface at least a portion of which reflects light.

In the cooktop of one embodiment, at least a portion of the knob inner may form a diffusing part configured to diffuse light.

In the cooktop of one embodiment, the insert may be disposed in a central portion of the knob inner, when viewed from a rear.

In the cooktop of one embodiment, the knob ring may be provided with at least one of openings, the light source part may be disposed at a rear of the knob ring, and at least one of the light sources may be disposed at a rear of at least one of the openings.

The cooktop in one embodiment may further include a supporter disposed between the knob ring and the light source part, provided with the light source part fixed to a rear surface thereof, and comprising at least one of convex parts protruding forward from a front surface of a portion corresponding to a position of the light source and disposed in a way that the convex part passes through the opening.

A knob assembly in one embodiment may include a knob body configured to rotate around a rotation shaft extended in a front-rear direction, a knob ring disposed at a rear of the knob body and having a diameter greater than a diameter of the knob body, a light diffusing part disposed between the knob body and the knob ring, and a light source part including at least one of light sources configured to irradiate light, a diameter of the light diffusing part may be greater than the diameter of the knob body and less than the diameter of the knob ring, a front surface of the light diffusing part may be exposed between the knob body and the knob ring, and at least one of the light sources may irradiate light to a space between the knob body and the knob ring.

In the knob assembly of one embodiment, the knob ring may include a plate formed into a flat plate, and a ring surrounding an outer edge of the plate, protruding from the plate forward and having a diameter greater than the diameter of the knob body, the light diffusing part may be formed into a doughnut, and a first surface may contact the plate while a second surface different from the first surface may contact the ring.

In the knob assembly of one embodiment, a front end of the light diffusing part may be disposed further rearward than a front end of the knob ring.

In the knob assembly of one embodiment, the diffusing part may include a flat plate doughnut part formed into a doughnut having a plate shape, and a cylinder part formed into a cylinder protruding forward from an outer edge of the flat plate doughnut part, and the first surface may be a rear surface of the flat plate doughnut part while the second surface may be an outer surface of the cylinder part.

In the knob assembly of one embodiment, a first reflective surface configured to reflect light may be formed in at least a portion of a rear surface of the knob body, and a second reflective surface configured to reflect light may be formed in at least a portion of a front surface of the knob ring.

In the knob assembly of one embodiment, at least a portion of the rear surface of the knob body may form a diffusing part configured to diffuse light, and the first reflective surface may be disposed in a central portion of the diffusing part, when viewed from a rear.

In the knob assembly of one embodiment, the knob ring may be provided with at least one of openings, the light source part may be disposed at a rear of the knob ring, and at least one of the light sources may be disposed at a rear of at least one of the openings.

The knob assembly of one embodiment may further include a supporter disposed between the knob ring and the light source part, provided with the light source part fixed to a rear surface thereof, and comprising at least one of convex parts protruding forward from a front surface of a portion corresponding to a position of the light source and disposed in a way that the convex part passes through the opening.

Advantageous Effect

A cooktop and a knob assembly thereof in one embodiment may emit light having constant brightness around a knob body, thereby enhancing user recognition of operation of a product and ensuring improvement in user convenience.

Specific effects are described along with the above-described effects in the section of Detailed Description.

BRIEF DESCRIPTION OF DRAWING

The accompanying drawings constitute a part of the specification, illustrate one or more embodiments in the disclosure, and together with the specification, explain the disclosure, wherein.

DETAILED DESCRIPTION

Figure 1:
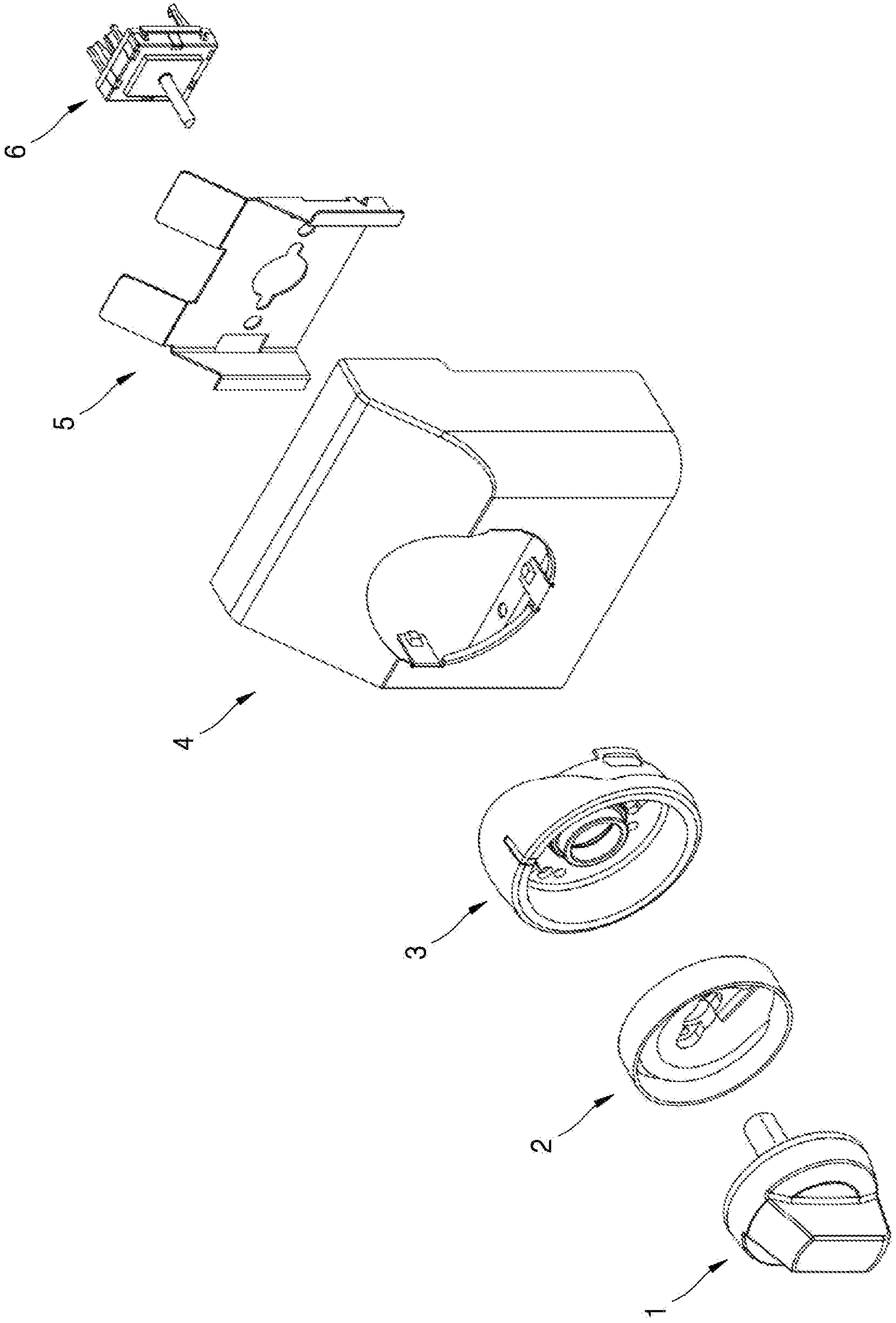
FIGS. 1 and 2 are views showing a switch assembly in prior art document 1.
Figure 2:
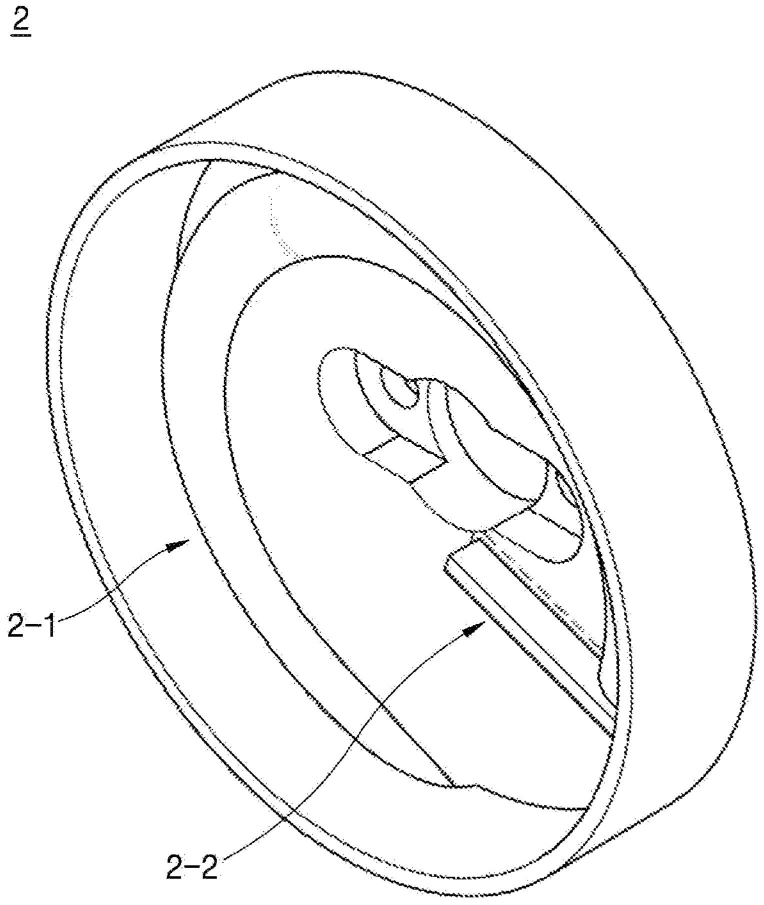
Figure 3:
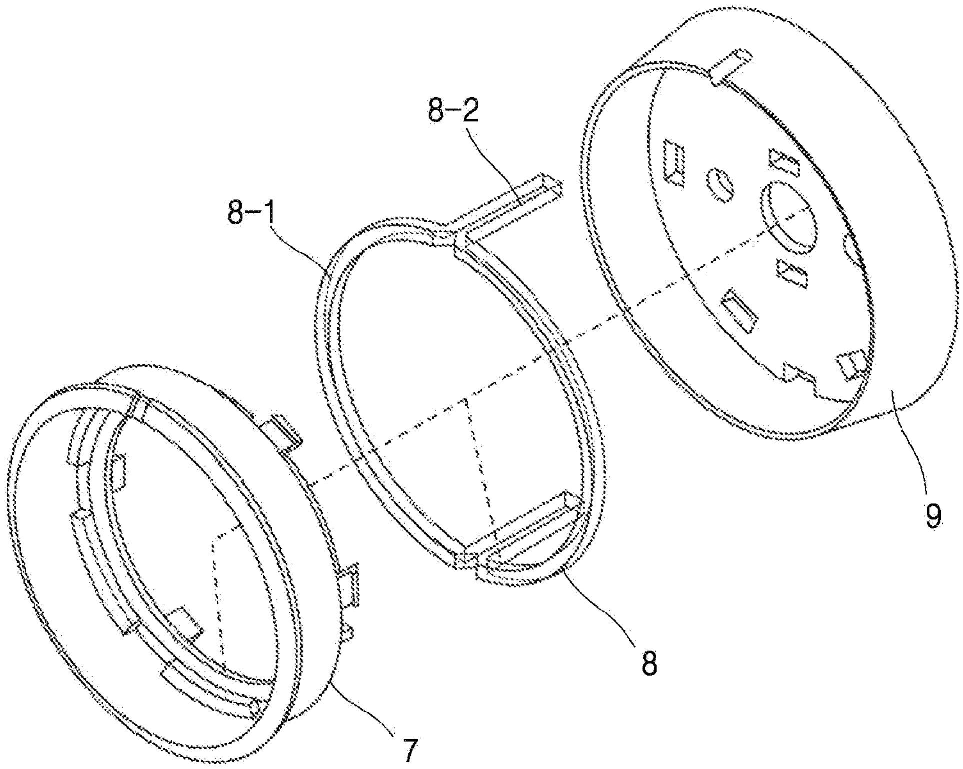
FIG. 3 is a view showing a portion of a knob assembly in prior art document 2.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms “first”, “second” and the like are used herein only to distinguish one component from another component. Thus, the components should not be limited by the terms. Certainly, a first component can be a second component unless stated to the contrary.

When one component is described as being “in an upper portion (or a lower portion)” of another component, or “on (or under)” another component, one component can be disposed on the upper surface (or under the lower surface) of another component, and an additional component can be interposed between another component and one component on (or under) another component.

When one component is described as being “connected”, “coupled”, or “connected” to another component, one component can be directly connected, coupled or connected to another component. However, it is also to be understood that an additional component can be “interposed” between the two components, or the two components can be “connected”, “coupled”, or “connected” through an additional corn.

Throughout the disclosure, each component can be provided as a single one or a plurality of ones, unless explicitly stated to the contrary.

The singular forms “a”, “an” and “the” are intended to include the plural forms as well, unless explicitly indicated otherwise. It should be further understood that the terms “comprise” or “include” and the like, set forth herein, are not interpreted as necessarily including all the stated components or steps but can be interpreted as excluding some of the stated components or steps or can be interpreted as including additional components or steps.

Throughout the disclosure, the terms “A and/or B” as used herein can denote A, B or A and B, and the terms “C to D” can denote C or greater and D or less, unless stated to the contrary.

Hereunder, a cooktop and a knob assembly thereof in several embodiments are described.

Figure 4:
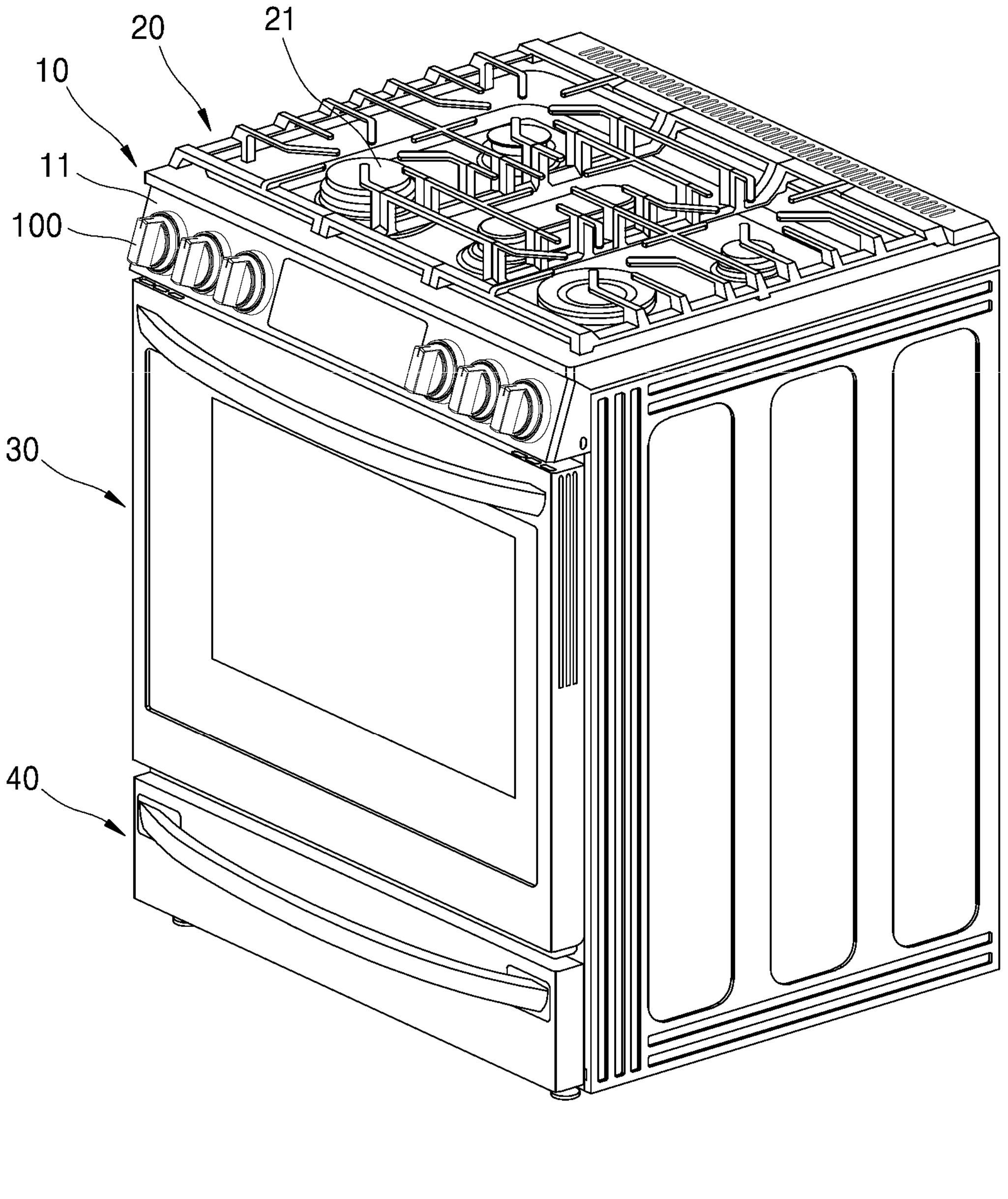
FIG. 4 is a view showing a cooktop provided with a knob assembly in one embodiment.

FIG. 4 is a view showing a cooktop provided with a knob assembly in one embodiment. The cooktop may include a manipulating part 10 and a heating part, and the heating part may include a cooktop part 20, an oven part 30 and a drawer 40.

Components for manipulating operation of the cooktop may be disposed at the manipulating part 10. For example, a knob assembly 100 may be disposed at the manipulating part 10, and the knob assembly 100 may rotate around a rotation shaft that extends in a front-rear direction to adjust a thermal power generated by each part (e.g., the cooktop part 20, the oven part 30 and the drawer 40) of the cooktop or to set an operation mode of each part of the cooktop. The knob assembly 100 may be fixed to a control panel 11 of the manipulating part 10.

The cooktop part 20 may be disposed in an upper portion of the cooktop. The cooktop part 20 may include at least one of cooktop burners 21. The cooktop burner 21 may heat a vessel containing a food item or directly heat a food item to cook the food item using a flame that is produced by burning gases.

The oven part 30 may be disposed in a central portion of the cooktop. The oven part 30 may include a main body forming a cooking space in which a food item is cooked, and a burner assembly for cooking a food item accommodated in the cooking space. Additionally, the oven part 30 may include a door for opening and closing the cooking space.

The drawer 40 may slide into the cooktop or may be withdrawn from the cooktop and may keep a vessel containing a food item and the like at a predetermined temperature.

In FIG. 4, the cooktop includes the oven part, the cooktop part and the drawer as a heating part for cooking a food item, for example. However, the cooktop in one embodiment may exclude some of the oven part, the cooktop part and the drawer.

Additionally, FIG. 4 shows a gas oven including the oven part, the cooktop part and the drawer, which are heating parts capable of cooking a food item, as an example of the cooktop. But the subject matter of the present disclosure may be applied to various types of cooktops such as a cooktop that generates heat using electricity rather than gas or an oven and the like. For example, the cooktop part of the cooktop according to the disclosure may include an induction heater capable of inductively heat a vessel and/or an electric heater capable of generating heat using electricity.

Hereunder, the front denotes a front-surface direction of the cooktop, and the rear denotes a rear-surface direction of the coking appliance, in the disclosure.

Figure 5:
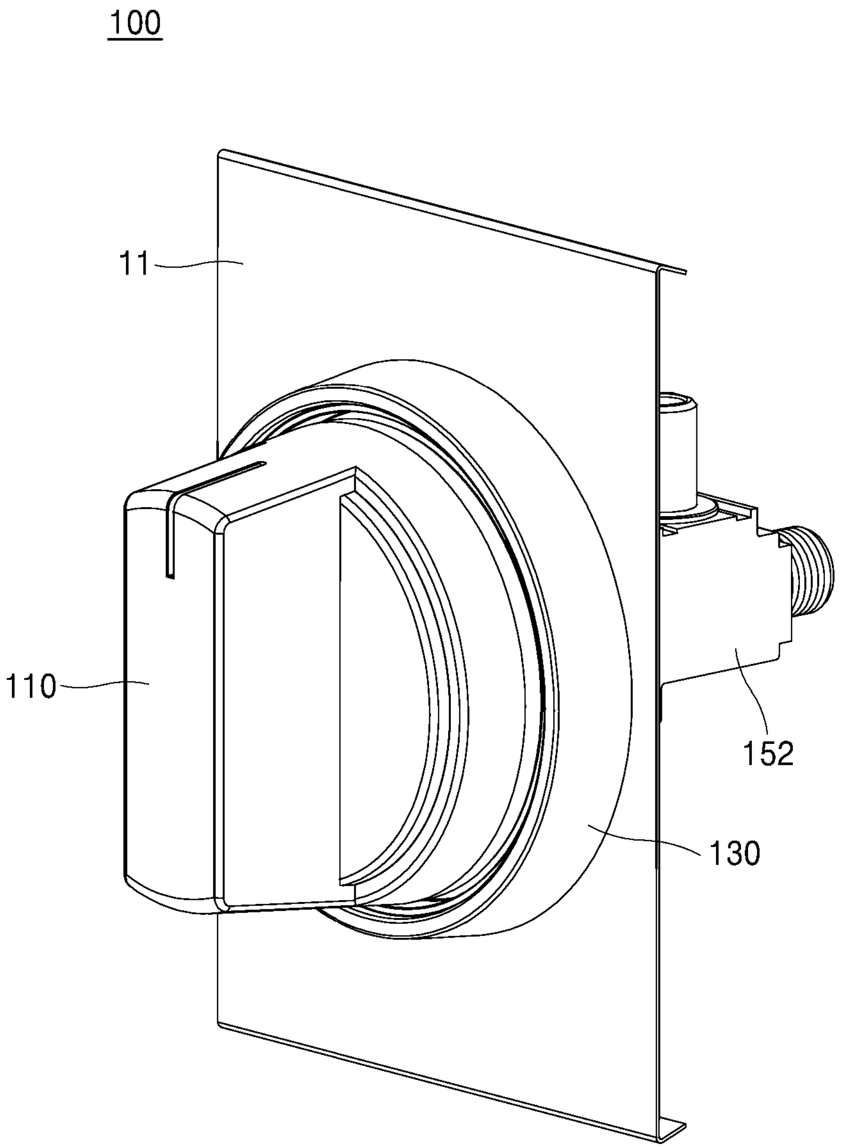
FIG. 5 is a perspective view showing the knob assembly in one embodiment.
Figure 6:
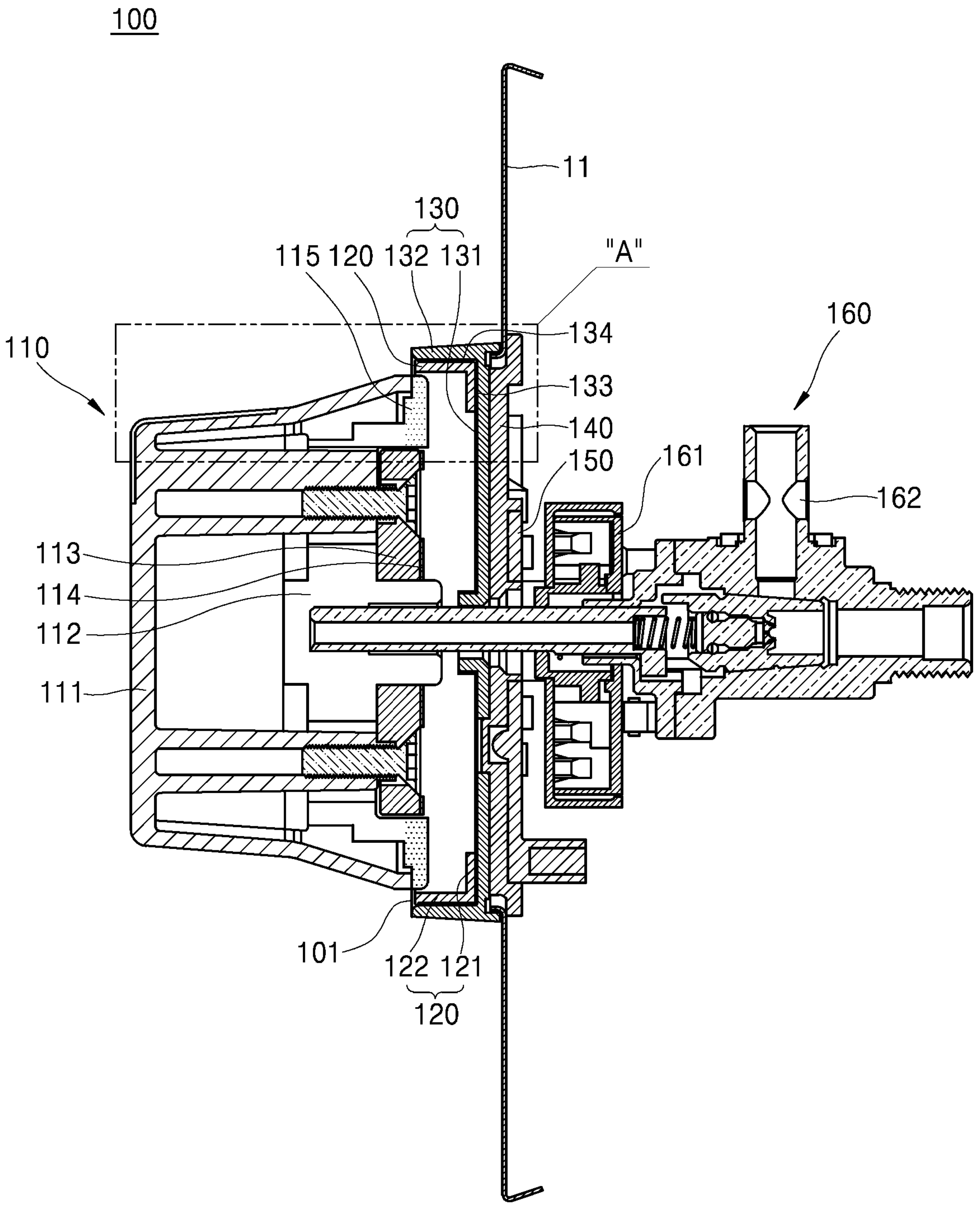
FIG. 6 is a cross-sectional view showing the knob assembly in one embodiment of FIG. 5.
Figure 7:
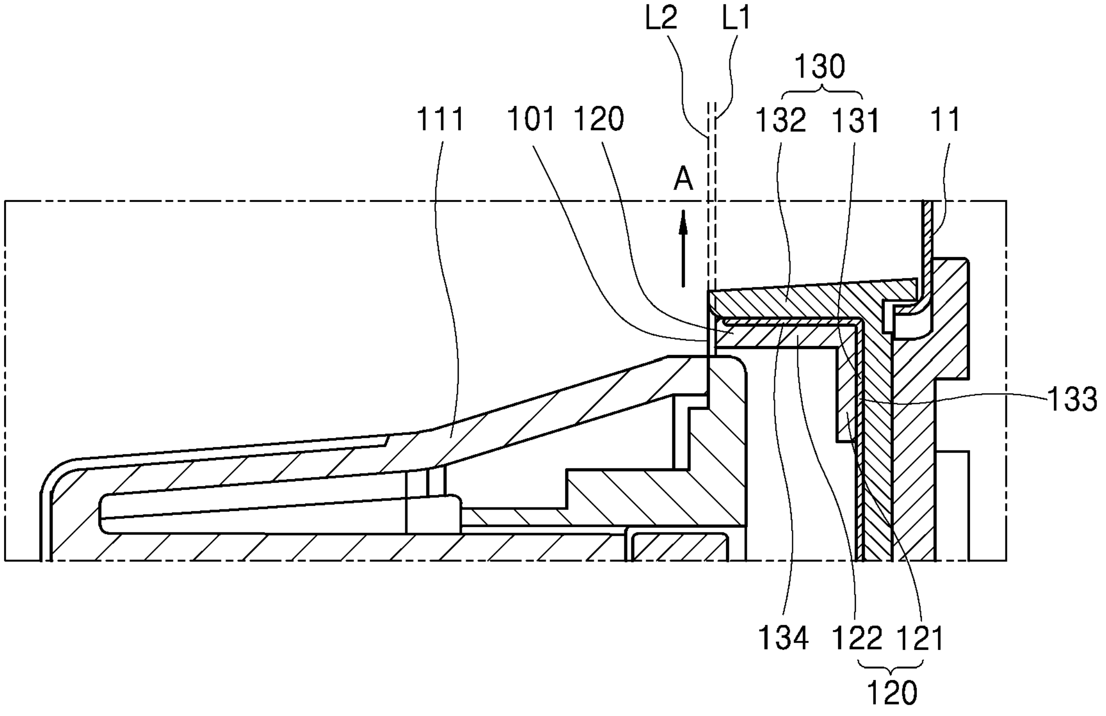
FIG. 7 is an enlarged view showing area A of the knob assembly in one embodiment of FIG. 5.
Figure 8:
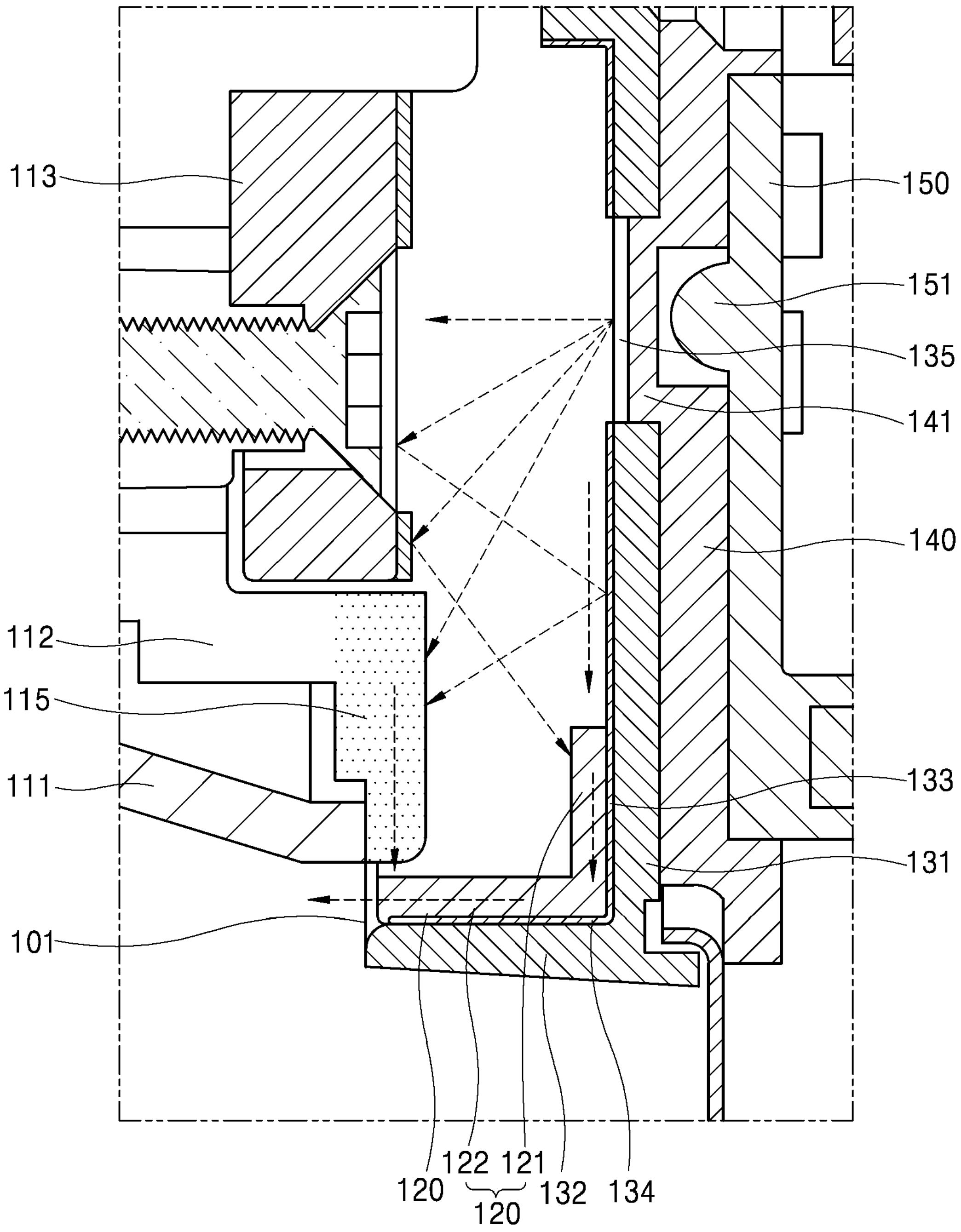
FIG. 8 is a view for describing the proceeding of light in the knob assembly of one embodiment.
Figure 9:
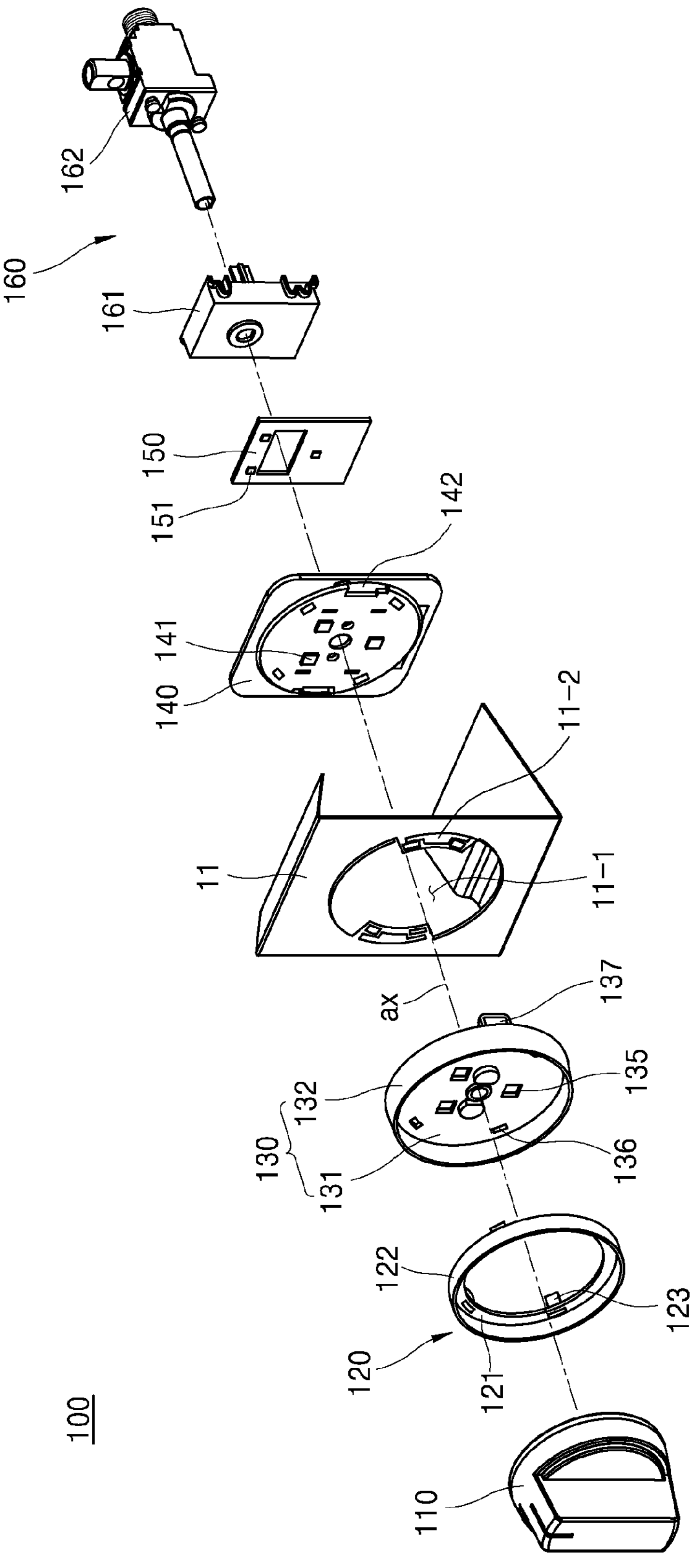
FIG. 9 is an exploded perspective view showing the knob assembly in one embodiment of FIG. 5.

FIG. 5 is a perspective view showing the knob assembly in one embodiment, FIG. 6 is a cross-sectional view showing the knob assembly in one embodiment of FIG. 5, FIG. 7 is an enlarged view showing area A of the knob assembly in one embodiment of FIG. 5, FIG. 8 is a view for describing the proceeding of light in the knob assembly of one embodiment, and FIG. 9 is an exploded perspective view showing the knob assembly in one embodiment of FIG. 5.

The knob assembly 100 in one embodiment may include a knob body 110, a light diffusing part 120, a knob ring 130, a supporter 140, a light source part 150, and an adjusting part 160. The knob ring 130 may include a plate 131 and a ring 132, and the adjusting part 160 may include an ignition switch 161 and a valve 162.

The knob body 110 may form an exterior of a front surface of the knob assembly 100. The knob body 110 may be formed into a single component based on integration, or may be comprised of a plurality of components based on coupling. The knob body 110 may rotate around a rotation shaft ax that extends in the front-rear direction. That is, the knob body 110 may be rotatably coupled to the light diffusing part 120, the knob ring 130, the supporter 140, the light source part 150 and the adjusting part 160.

The knob body 110 may be provided with a reflective surface capable of reflecting light, in at least a portion of a rear surface thereof. Additionally, the knob body 110 may include a light diffusing part capable of diffusing light. Specifically, the knob body 110 may include a knob 111, a knob inner 112, and an insert 113. The insert 113 may be provided with a first reflective surface 114 capable of reflecting light, in at least a portion of a rear surface thereof. Further, at least a portion of the knob inner 112 may be formed in to a light diffusing part 115 capable of diffusing light. In FIG. 6, a portion, which is disposed on an edge of the insert 113 in the knob inner 112 and faces the knob ring 120, is formed into the light diffusing part 115, for example. However, the knob inner 112 may be made of a material that diffuses light in the entire knob inner 12. Below, the configuration of the knob body 110 is described in detail with reference to FIG. 10.

The light diffusing part 120 may be disposed between the knob body 110 and the knob ring 130. The light diffusing part 120 may have a diameter greater than a diameter of the knob body 110 and less than a diameter of the knob ring 130. The light diffusing part 120 may be inserted into a space formed by the plate 131 and ring 132 of the knob ring 130. A front surface of the light diffusing part 120 may be exposed to a gap 101 between the knob body 110 and the knob ring 130.

Specifically, the light diffusing part 120 may have a doughnut shape. The light diffusing part 120 may have a plurality of surfaces, and among the surfaces, a first surface may contact the plate 131 of the knob ring 130, and a second surface different from the first surface may contact the ring 132 of the knob ring 130. The light diffusing part 120 may include a flat plate doughnut part 121 formed into a doughnut having a flat plate shape, and a cylinder part 122 having a cylinder shape and protruding forward from an outer edge of the flat plate doughnut part. In this case, a rear surface of the flat plate doughnut part 121 may be the first surface contacting the plate 131 of the knob ring 130, and an outer surface of the cylinder part 122 may be the second surface contacting the ring 132 of the knob ring 130. That is, in the light diffusing part 120, one side of a cross section of the doughnut shape may protrude forward from the doughnut shape and have a thickness greater than a thickness of the other side that does not protrude forward, and the cross section of the light diffusing part 120 may have a "⌊" shape. One surface outside the light diffusing part 120 (i.e., a rear surface of the light diffusing part 120) may entirely contact the plate 131 of the knob ring 130, and another surface outside the light diffusing part 120 (i.e., a lateral surface of the light diffusing part 120) may entirely contact the ring 132 of the knob ring 130. The front surface of the light diffusing part 120, adjacent to the surface in contact with the ring 132 of the knob ring 130, may be exposed to the gap 101 between the knob body 110 and the knob ring 130. The light diffusing part 120 may include a coupling hook 123 that protrudes rearward.

Referring to FIG. 7, a front end L1 of the light diffusing part 120 may be disposed further rearward than a front end L2 of the knob ring 130. Accordingly, light may be prevented from proceeding in a lateral surface direction (direction A) of the knob assembly 100, thereby improving visibility.

The knob ring 130 may be disposed at a rear of the knob body 110 and may form an exterior of the knob assembly 100. The knob ring 130 may be made of an opaque material and fixed to the control panel 11. Additionally, the knob ring 130 may protect the supporter 140.

The knob ring 130 may be short entirely and formed into a cylinder having a front surface that is completely open. The knob ring 130 may include a plate 131 formed into a flat plate, and a ring 132 surrounding an outer edge of the plate 131 and protruding forward from the plate 131. The ring 132 may have a diameter greater than a diameter of the knob body 110. Additionally, the plate 131 may be provided with an opening 135 through which light passes and/or a coupling hole 136 for a coupling with the light diffusing part 120. The coupling hook 123 of the light diffusing part 120 may be fitted-coupled to and the coupling hole 136 of the knob ring 130.

At least a portion of the knob body 110 may be inserted into the space formed by the plate 131 and the ring 132. The light diffusing part 120 may be disposed between the knob body 110 and the knob ring 130.

A second reflective surface capable of reflecting light may be formed in at least a portion of surfaces (i.e., a front surface of the plate 131 and an inner surface of the ring 132) of the knob ring 130, on which the knob body 110 is disposed. Specifically, the second reflective surface may include a 2-1 reflective surface 133 formed in at least a portion of the front surface of the plate 131, and a 2-2 reflective surface 134 formed in at least a portion of the inner surface of the ring 132. A portion of the 2-1 reflective surface 133 and/or the 2-2 reflective surface 134 may be formed in a way that a portion of the surfaces of the knob ring 130, which face the knob body 110, is plated or coated. Since the knob ring 130 (specifically, the 2-1 reflective surface 133 and the 2-2 reflective surface 134) reflects light, brightness of light emitted from the knob assembly 100 may become higher, thereby improving visibility.

Additionally, the knob ring 130 may further include a coupling hook 137 protruding rearward from the knob ring 130 to be coupled to the supporter 140. The coupling hook 137 may be fitted-coupled to a coupling hole 142 of the supporter 140. In this case, the coupling hook 137 may pass through a panel hole 11-2 of the panel 11 and be coupled to the coupling hole 142.

The supporter 140 may be disposed at a rear of the knob ring 130. The supporter 140 may fix and protect the light source part 150.

A convex part 141 may be formed on a front surface of a portion of the supporter 140, in which a light source 151 of the light source part 150 is disposed, in a way that the convex part 141 protrudes from a surface of the supporter 140. Additionally, a coupling hole 142 fora coupling with the control panel 11 and the knob ring 130 may be formed on the supporter 140.

The light source part 150 may be disposed at a rear of the supporter 140. The light source part 150 may include at least one of light sources 151 configured to irradiate light. The light source 151 may be a light-emitting diode.

The light source part 150 may be fixed to a rear surface of the supporter 140.

The adjusting part 160 may adjust thermal power output from the cooktop, or adjust operation of the cooktop such as a mode of the cooktop and the like, as a result of rotation of the knob body 110. When the cooktop uses gas as a heat source, the adjusting part 160 may include an ignition switch 161 or a valve 162.

The ignition switch 161 may receive torque of the knob body 110. An on/off state of the ignition switch 161 may change based on a rotation angle of the knob body 110. The ignition switch 161 may be turned on and produce a spark on a fire mouth of a burner 21 in FIG. 4 when the knob body 110 makes a rotation of a predetermined angle.

The valve 162 may receive torque from the knob body 110. An opening degree of the valve 162 may be determined based on a rotation degree of the knob body 110. In some cases, the valve 162 may receive a rotation force from the knob body 110 only when the knob body 110 rotates in a state of being pressed.

The ignition switch 161 and the valve 162 may receive torque of the knob body 110 through a valve shaft.

The control panel 11 may be disposed between the knob ring 130 and the supporter 140. The knob ring 130 and/or the supporter 140 may be coupled to the control panel 11. The control panel 11 may be a portion (e.g., a front surface of the cooktop part 10 in FIG. 4) of the cooktop or a portion of the knob assembly 100. The control panel 11 may have an opening 11-1 through which light of the light source part 150 passes. The convex part 141 of the supporter 140 may be disposed to pass through the opening 11-1. Additionally, the control panel 11 may have at least one of panel holes 11-2 through which the knob ring 130 and/or the supporter 140 are coupled to the control panel 11.

Referring to FIG. 8, a path in which light proceeds in the knob assembly of one embodiment is described. In FIG. 8, dashed arrows indicate directions in which light proceeds.

As described above, the light source part 150 may be fixed to the supporter 140, and the convex part 141 may be formed on the front surface of the supporter 140, corresponding to a position of the light source 151. Additionally, an opening 135 may be formed on the knob ring 130, and the convex part 141 may pass through a light transmitting hole 135.

Light irradiated from the light source 151 of the light source part 150 may pass through the convex part 141 of the supporter 140 and proceed to a space between the knob ring 130 and the knob body 110.

Some of the light rays having passed through the convex part 141 may be incident on the light diffusing part 120. The other light rays having passed though the convex part 141 may be scattered and reflected by the insert 113 and the knob ring 130, and some of the light rays scattered and reflected may be incident on the light diffusing part 120. When the convex part 141 protrudes further than the front surface of the plate 131 of the knob ring 130, an amount of light rays directly incident on the light diffusing part 120 may increase among the light rays having passed through the convex part 141.

The light incident on the light diffusing part 120 may be emitted out of the knob assembly through the front surface of the light diffusing part 120, thereby allowing the user to recognize the light. In this case, to improve visibility, the front end of the light diffusing part 120 may be disposed further rearward than the front end of the knob ring 130.

The light diffusing part 120 may be slightly spaced from the knob body 110 and the knob inner 112.

Some of the light rays having passed through the convex part 141, and some of the light rays scattered and reflected may diffuse in the knob inner 112 (specifically, a diffusing part 115 in FIG. 6 of the knob inner 112), and the diffused light rays may proceed to the gap (specifically, the gap between the knob 111 and the light diffusing part 120) between the knob 111 and the knob ring 130 through an outer end of the knob inner 112, to allow the user to recognize the light rays.

Light reflected by the knob body 110 and the knob ring 130 and the like may be emitted through the gap between the knob 111 and the light diffusing part 120.

That is, in one embodiment, light may be emitted toward a front of the knob assembly 100 through the light diffusing part 120 disposed between the knob body 110 and the knob ring 130. Accordingly, the user may see light having constant brightness entirely around the knob body 110 of the knob assembly 100.

Additionally, light reflected by the insert 113 and the knob ring 130 may be incident on the light diffusing part 120, thereby increasing brightness.

Figure 10:
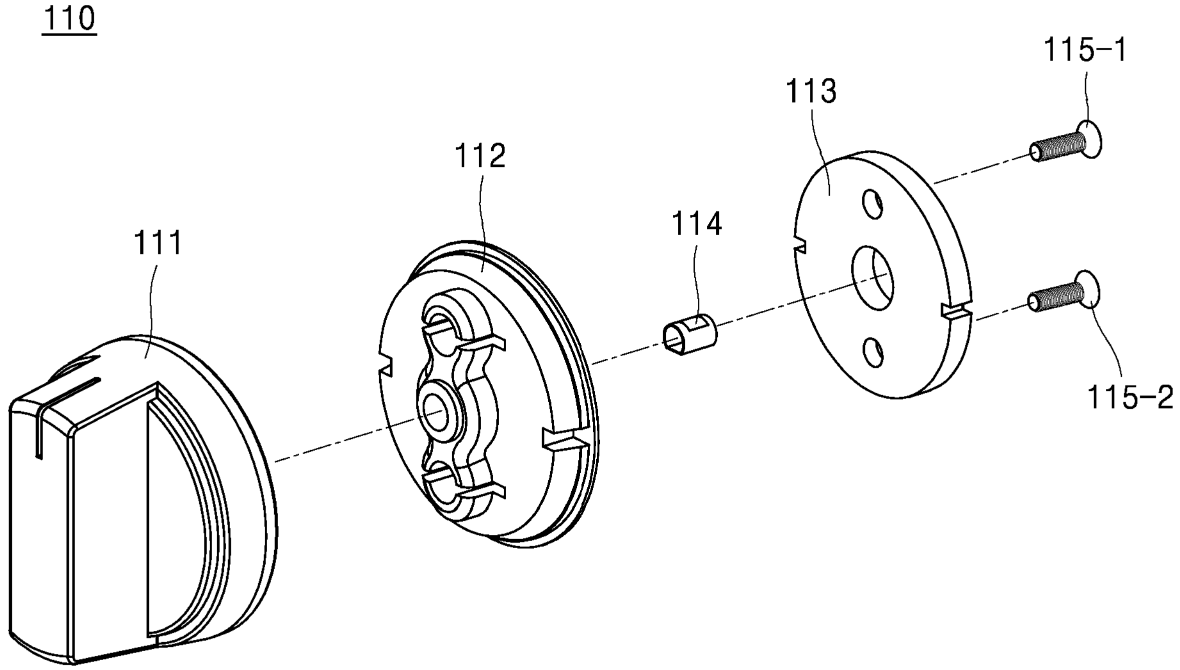
FIG. 10 is an exploded perspective view showing an example of a knob body of the knob assembly in one embodiment.

FIG. 10 is an exploded perspective view schematically showing an example of a knob body 110 of the knob assembly 100 in one embodiment. The knob body 110 may include a knob 111, a knob inner 112, an insert 113, a spring 114, and a screw bolt 115-1, 115-2.

The knob 111 may form an exterior of a front surface of the knob assembly 100. The knob 111 may include a cylindrical body and a handle protruding forward from the body. The knob 111 may have a rear surface that is open, and an inner surface may be formed inside the open surface, and the knob 111 may be formed as a result of injection molding.

The knob inner 112 may be inserted into the inner space of the knob 111 through the rear surface of the knob 111. The knob inner 112 may have a rear surface that is open, and an inner space may be formed inside the open surface. Additionally, the knob inner 112 may be made of a material capable of diffusing light. For example, the knob inner 112 may be made of an opaque plastic material. That is, in one embodiment, the knob inner 112 capable of diffusing light may be disposed between the knob 111 and the light source part 150. Since the knob inner 112 diffuses light, the light diffused by the knob inner 112 in addition to the light diffused by the light diffusing part 120 may be emitted out of the knob assembly, thereby improve visibility further. As described above, some of the knob inners 112 may be configured to diffuse light.

The insert 113 may be inserted into the inner space of the knob inner 112 through the rear surface of the knob inner 112. The insert 113 may be made of a material such as metal, and inserted into the knob 111 along with the knob inner 112, thereby improving rigidity and preventing deformation of the knob 111.

The rear surface of the insert 113 may reflect light. To this end, the rear surface of the insert 113 may be plated or coated. A plated or coated portion may form the first reflective surface 114.

The spring 114 may be disposed in the knob body 110 and connect between the knob 111 and the valve shaft.

The screw bolt 115-1, 115-2 may fix the knob inner 112 and the insert 113 to the knob 111.

Figure 11:
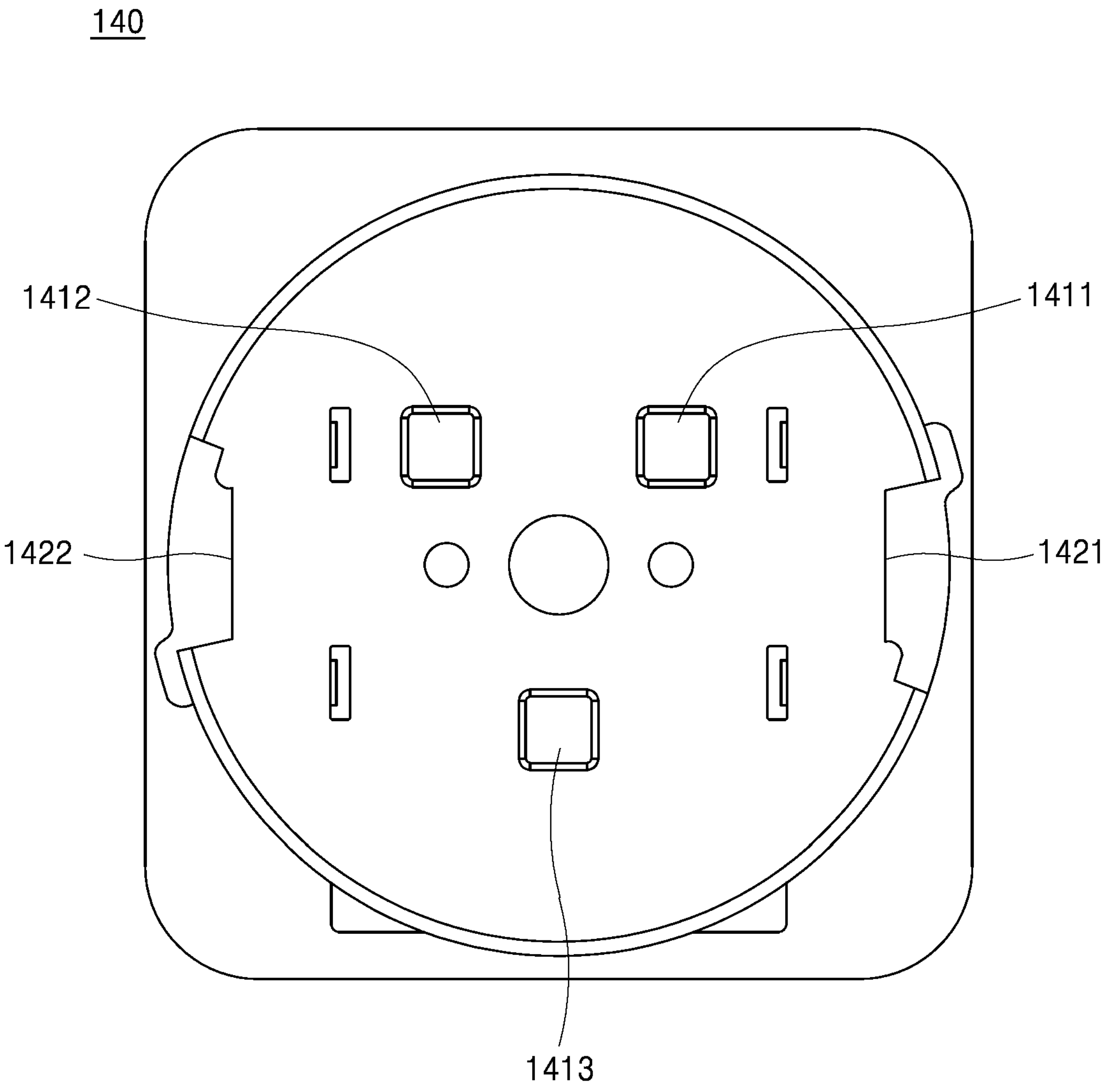
FIG. 11 is a view showing a supporter of the knob assembly in one embodiment, when viewed from a front.
Figure 12:
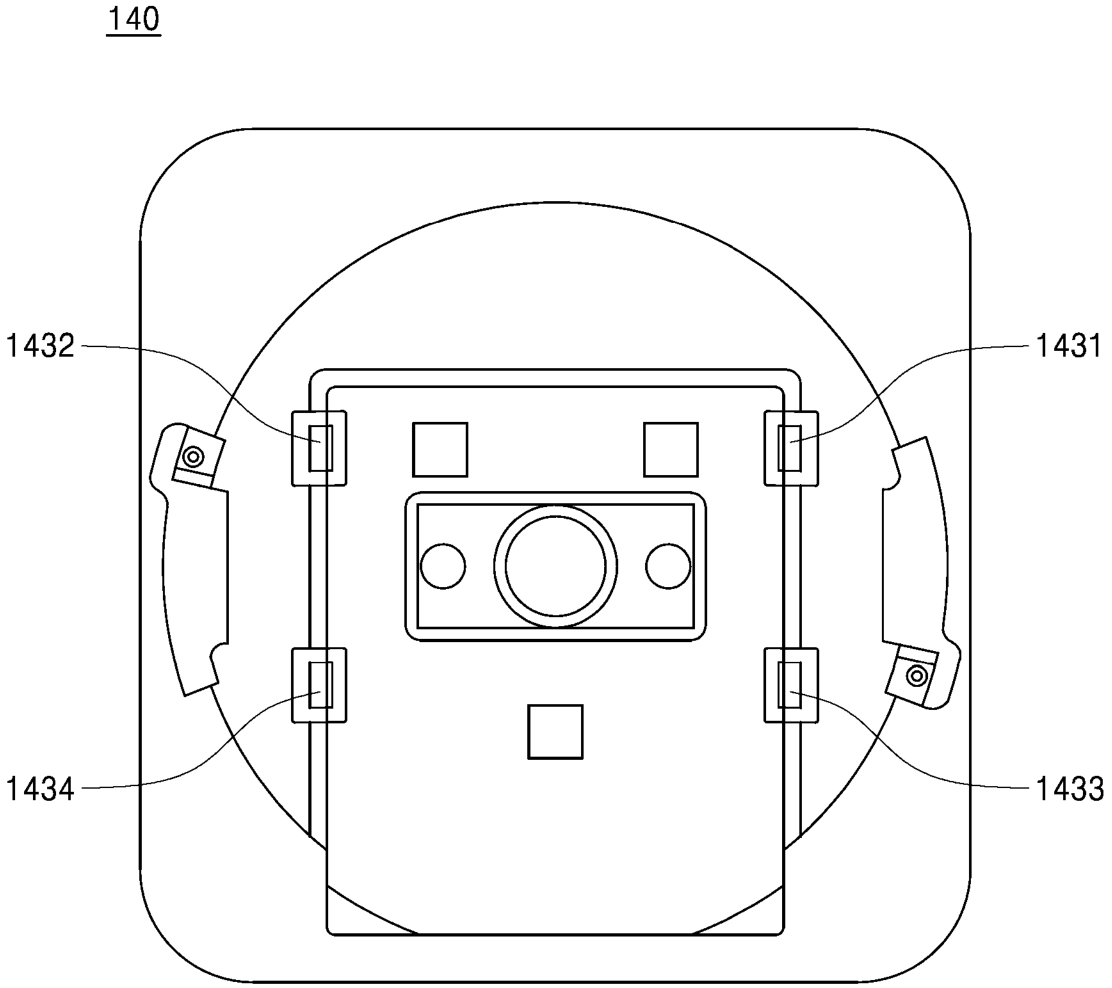
FIG. 12 is a view showing the supporter of the knob assembly in one embodiment, when viewed from a rear.

FIG. 11 is a view showing a supporter 140 of the knob assembly 100 in one embodiment, when viewed from a front, and FIG. 12 is a view showing the supporter 140 of the knob assembly 100 in one embodiment, when viewed from a rear.

The supporter 140 may fix and protect the light source part 150. The supporter 140 may be made of a material capable of transmitting and/or diffusing light. For example, the supporter 140 may be made of an opaque plastic material.

Referring to FIG. 11, the supporter 140 may have a plurality of convex parts 1411, 1412, 1413, on the front surface thereof. The plurality of convex parts 1411, 1412, 1413 may be formed at a position corresponding to the position of the light source 151 of the light source part 150. That is, when the light source part 150 is fixed to the rear surface of the supporter 140, the convex part may be formed on a front surface of the position at which the light source 151 of the light source part 150 is disposed. The convex parts 1411, 1412, 1413 may perform a function similar to a function of a lens.

Additionally, the supporter 140 may be provided with at least one of coupling holes 1421, 1422 fora coupling with the knob ring 130. The coupling hole 1421, 1422 may be fitted-coupled to the coupling hook (137 in FIG. 9) of the knob ring 130.

Referring to FIG. 12, a light source fixing part 1431, 1432, 1433, 1434 may be disposed on the rear surface of the supporter 140. The light source part 150 may be fitted-coupled to the light source fixing part 1431, 1432, 1433, 1434 and fixed to the supporter 140.

Figure 13:
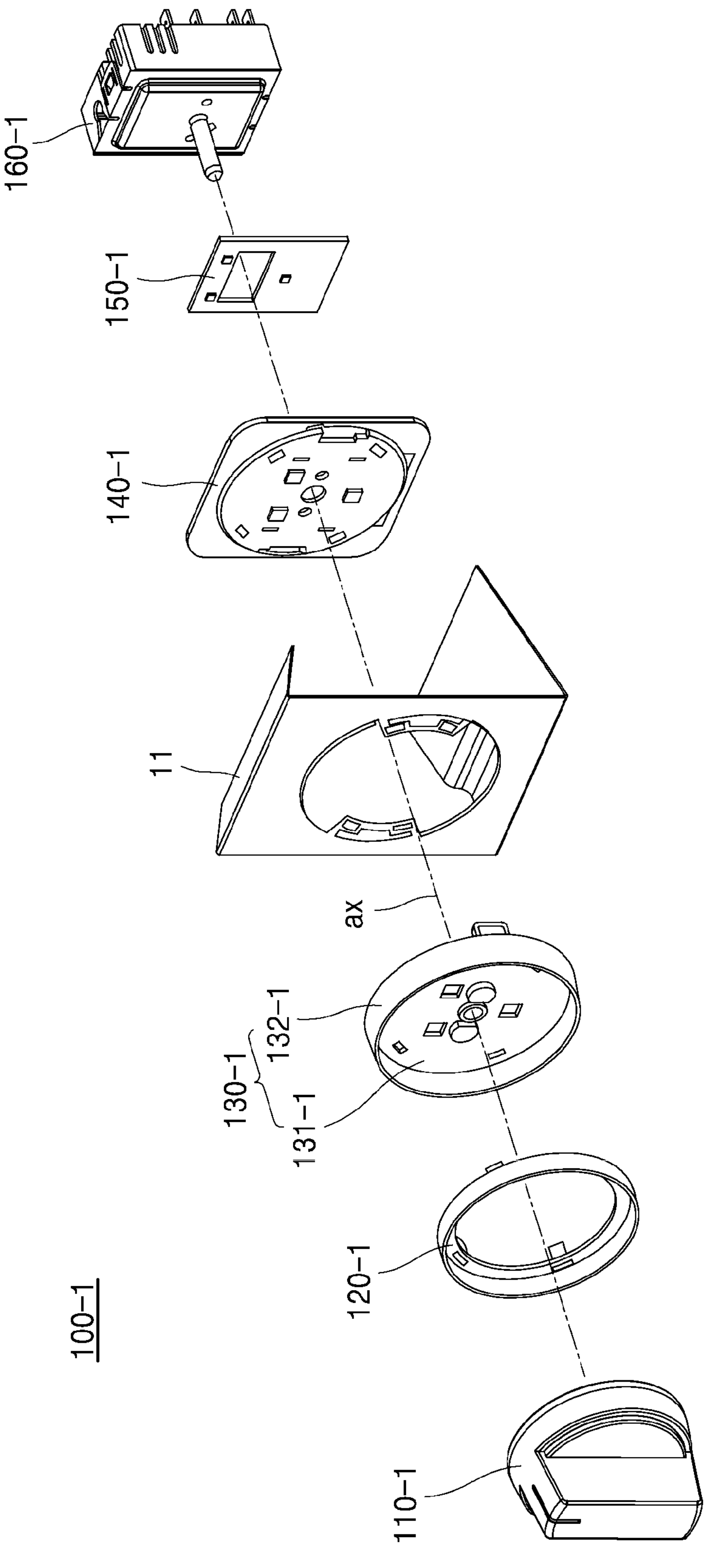
FIG. 13 is an exploded perspective view showing a knob assembly in another embodiment.

FIG. 13 is an exploded perspective view showing a knob assembly 100-1 in another embodiment. The knob assembly 100-1 may include a knob body 110-1, a light diffusing part 120-1, a knob ring 130-1, a supporter 140-1, a light source part 150-1, and an adjusting part 160-1. The adjusting part 160-1 may be a rotary switch. In FIG. 13, reference numeral 11 indicates a control panel.

Each of the knob body 110-1, the light diffusing part 120-1, the knob ring 130-1, the supporter 140-1 and the light source part 150-1 may be the same as the knob body 110, the light diffusing part 120, the knob ring 130, the supporter 140 and the light source part 150 that are described with reference to FIGS. 7 to 12. The adjusting part 160-1 may perform the same function as the adjusting part 160.

That is, the knob assembly 100-1 in FIG. 13 is the same as the knob assembly 100 described with reference to FIG. 7 and the like except that the adjusting part 160-1 is a rotary switch. When the cooktop inductively heats a vessel or when the cooktop adopts an electric heater and the like using electricity to generate heat, a rotary switch may be applied instead of the adjusting part comprised of the ignition switch and the valve.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

The invention claimed is:

1. A cooktop, comprising:
a heating part configured to heat a target object; and
a manipulating part comprising (i) a control panel and (ii) a knob assembly that is coupled to the control panel and that is configured to control the heating part,
wherein the knob assembly includes:
a knob body that is disposed at a front surface of the control panel and that is configured to rotate with respect to a rotation shaft extended in a front-rear direction,
a knob ring that is disposed at a rear side of the knob body and that has a diameter greater than a diameter of the knob body,
a light diffusing part disposed between the knob body and the knob ring, and
a light source part comprising one or more light sources configured to irradiate light,
wherein a diameter of the light diffusing part is greater than the diameter of the knob body and less than the diameter of the knob ring,
wherein a front surface of the light diffusing part is exposed between the knob body and the knob ring, and
wherein at least one of the one or more light sources is configured to irradiate light to a space between the knob body and the knob ring, and
wherein the knob body comprises:
a knob that defines an exterior of a front surface of the knob assembly and that defines an opening at a rear side of the knob, the opening at the rear side of the knob defining a first inner space,
a knob inner that is inserted into the first inner space and that defines an opening at a rear side of the knob inner, the opening at the rear side of the knob inner defining a second inner space, and
an insert that is inserted into the second inner space, a portion of a rear surface of the insert being configured to reflect light.

2. The cooktop of claim 1, wherein the knob ring comprises:
a plate, and
a ring that surrounds an outer edge of the plate, that protrudes from the plate, and that has a diameter greater than the diameter of the knob body.

3. The cooktop of claim 2, wherein a portion of the knob body is inserted into a space defined by the plate and the ring.

4. The cooktop of claim 2, wherein:
the light diffusing part has a ring shape,
a first surface of the light diffusing part contacts the plate, and
a second surface of the light diffusing part contacts the ring.

5. The cooktop of claim 4, wherein a front end of the light diffusing part is disposed further rearward than a front end of the knob ring.

6. The cooktop of claim 4, wherein the light diffusing part comprises:
a flat plate doughnut part having a ring shape, and
a cylinder part protruding forward from an outer edge of the flat plate doughnut part,
wherein the first surface is a rear surface of the flat plate doughnut part, and the second surface is an outer surface of the cylinder part.

7. The cooktop of claim 1, wherein a portion of a front surface of the knob ring is configured to reflect light.

8. The cooktop of claim 1, wherein a portion of the knob inner provides a diffusing part configured to diffuse light.

9. The cooktop of claim 8, wherein the insert is disposed at a central portion of the knob inner.

10. The cooktop of claim 1, wherein:
the knob ring defines one or more openings,
the light source part is disposed at a rear side of the knob ring, and
at least one of the one or more light sources is disposed at a rear side of the one or more openings of the knob ring.

11. The cooktop of claim 10, further comprising:
a supporter that is disposed between the knob ring and the light source part,
wherein the light source part is coupled to a rear surface of the supporter, and
wherein the supporter includes one or more convex parts protruding forward from a front surface of a portion corresponding to a position of one of the one or more light sources and passing through the one or more openings.

12. A knob assembly, comprising:
a knob body configured to rotate with respect to a rotation shaft extended in a front-rear direction;
a knob ring that is disposed at a rear side of the knob body and that has a diameter greater than a diameter of the knob body;
a light diffusing part disposed between the knob body and the knob ring; and
a light source part comprising one or more light sources configured to irradiate light,
wherein a diameter of the light diffusing part is greater than the diameter of the knob body and less than the diameter of the knob ring,
wherein a front surface of the light diffusing part is exposed between the knob body and the knob ring, and
wherein at least one of the one or more light sources is configured to irradiate light to a space between the knob body and the knob ring, and wherein the knob body comprises:

a knob that defines an exterior of a front surface of the knob assembly and that defines an opening at a rear side of the knob, the opening at the rear side of the knob defining a first inner space, a knob inner that is inserted into the first inner space and that defines an opening at a rear side of the knob inner, the opening at the rear side of the knob inner defining a second inner space, and an insert that is inserted into the second inner space, a portion of a rear surface of the insert defining a first reflective surface configured to reflect light.

13. The knob assembly of claim 12, wherein the knob ring comprises:

a plate, and a ring that surrounds an outer edge of the plate, that protrudes from the plate, and that has a diameter greater than the diameter of the knob body, wherein the light diffusing part has a ring shape, wherein a first surface of the light diffusing part contacts the plate, and wherein a second surface of the light diffusing part contacts the ring.

14. The knob assembly of claim 13, wherein a front end of the light diffusing part is disposed further rearward than a front end of the knob ring.

15. The knob assembly of claim 13, wherein the light diffusing part comprises:

a flat plate doughnut part having a ring shape, and a cylinder part protruding forward from an outer edge of the flat plate doughnut part, wherein the first surface is a rear surface of the flat plate doughnut part, and the second surface is an outer surface of the cylinder part.

16. The knob assembly of claim 12, wherein a portion of a front surface of the knob ring defines a second reflective surface configured to reflect light.

17. The knob assembly of claim 16, wherein:

a portion of the rear surface of the knob body provides a diffusing part configured to diffuse light, and the first reflective surface is disposed at a central portion of the diffusing part.

18. The knob assembly of claim 12, wherein:

the knob ring defines one or more openings, the light source part is disposed at a rear side of the knob ring, and at least one of the one or more light sources is disposed at a rear side of the one or more openings.

19. The knob assembly of claim 18, further comprising:

a supporter that is disposed between the knob ring and the light source part, wherein the light source part is coupled to a rear surface of the supporter, and wherein the supporter includes one or more convex parts protruding forward from a front surface of a portion corresponding to a position of one of the one or more light sources and passing through the one or more openings.

* * * * *